US008038304B2

(12) United States Patent
Mizuuchi et al.

(10) Patent No.: US 8,038,304 B2
(45) Date of Patent: Oct. 18, 2011

(54) PROJECTOR SYSTEM AND VIDEO PROJECTION METHOD

(75) Inventors: Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 459 days.

(21) Appl. No.: 12/305,493

(22) PCT Filed: Jun. 19, 2007

(86) PCT No.: PCT/JP2007/062309
§ 371 (c)(1),
(2), (4) Date: Dec. 18, 2008

(87) PCT Pub. No.: WO2008/004438
PCT Pub. Date: Jan. 10, 2008

(65) Prior Publication Data
US 2009/0207322 A1 Aug. 20, 2009

(30) Foreign Application Priority Data

Jul. 3, 2006 (JP) .................................. 2006-182973

(51) Int. Cl.
*G03B 21/14* (2006.01)
*H04N 3/22* (2006.01)
*H04N 9/64* (2006.01)
*H04N 1/46* (2006.01)
*G01B 9/02* (2006.01)

(52) U.S. Cl. ............. 353/79; 353/69; 348/745; 348/250; 358/514; 356/478

(58) Field of Classification Search .................... 353/79, 353/69, 70; 348/745, 250, 222.1, 298; 358/514; 356/478
See application file for complete search history.

(56) References Cited

U.S. PATENT DOCUMENTS

| 5,883,476 A | * | 3/1999 | Noguchi et al. | ......... 315/368.12 |
| 6,636,274 B1 | * | 10/2003 | Mazda et al. | .................. 348/745 |
| 2005/0259226 A1 | * | 11/2005 | Gilg et al. | ....................... 353/69 |

FOREIGN PATENT DOCUMENTS

| JP | 6-167687 | 6/1994 |
| JP | 7-24140 | 1/1995 |
| JP | 2004-341029 | 12/2004 |
| JP | 2005-123855 | 5/2005 |
| JP | 2005-292563 | 10/2005 |
| JP | 2005-339269 | 12/2005 |

OTHER PUBLICATIONS

International Search Report issued Jul. 17, 2007 in the International (PCT) Application No. PCT/JP2007/062309.

* cited by examiner

*Primary Examiner* — Georgia Y Epps
*Assistant Examiner* — Magda Cruz
(74) *Attorney, Agent, or Firm* — Wenderoth, Lind & Ponack, L.L.P.

(57) ABSTRACT

A projector system is provided with at least one projector mobile in a specified space and adapted to project a video to a projection area included in the specified space in accordance with inputted video information, a plurality of position sensors each including a position detecting section for detecting a positional relationship of the projector with the projection area and arranged in a specified positional relationship with the specified space, and a controller for controlling a video to be projected from the projector to the projection area based on detection results by the position detecting sections of the plurality of position sensors.

18 Claims, 8 Drawing Sheets

PROJECTOR SYSTEM AND VIDEO PROJECTION METHOD

FIELD OF TECHNOLOGY

The present invention relates to a projector system using a mobile projector and a video projection method thereof.

DESCRIPTION OF THE BACKGROUND ART

There is known a projector in which a small-size projection unit and a direction sensor or an acceleration sensor are incorporated into a helmet (patent literatures 1, 2). This is constructed such that a facing direction of the projector is detected by the sensor incorporated in the projector and a display image is projected while being appropriately changed based on detection information.

In another projector, there is known a method for optimizing a projected image from image information by taking in an image projected from the projector again (patent literature 3). By this method, the display information of the image projected by the projector is obtained by a CCD or the like, and the display image is projected while being appropriately changed based on that information.

There is also known a method for controlling the position of a projector by providing a reference point on a screen and detecting the reference point using an image sensor (patent literature 4).

However, since the facing direction of a user is detected by the direction sensor or the acceleration sensor by the method disclosed in patent literatures 1 and 2, it is not easy to precisely detect the posture and distance of the projector with respect to a projection plane. Thus, there has been a problem of difficulty in properly projecting a display image according to the posture of the projector with respect to the projection plane and a distance of the projector to the projection plane.

On the other hand, in the construction disclosed in patent literature 3 for detecting the display image, there has been a problem of taking time to display a precise image with a mobile projector with volatile movements since it takes time for focus control and image analysis to precisely read the display image. If the display surface is on the corner or not a flat surface, e.g. with unevenness, there has been a problem of being unable to determine optimal projection conditions from image information.

By the method disclosed in patent literature 4, positioning cannot be performed unless the reference point on the screen can be detected, wherefore there has been a problem of restricting the display surface of the projector to a limited place.

Patent Literature 1:
  Japanese Unexamined Patent Publication No. H07-24140
Patent Literature 2:
  Japanese Unexamined Patent Publication No. H06-167687
Patent Literature 3:
  Japanese Unexamined Patent Publication No. 2005-339269
Patent Literature 4:
  Japanese Unexamined Patent Publication No. 2005-292563

DISCLOSURE OF THE INVENTION

An object of the present invention is to provide a projector system capable of detecting a positional relationship of a projector with a projection area in a specified space, thereby projecting a video suitable for the positional relationship from the projector to the projection area.

One aspect of the present invention is directed to a projector system comprising at least one projector mobile in a specified space and adapted to project a video to a projection area included in the specified space in accordance with inputted video information; a plurality of position sensors each including a position detecting section for detecting a positional relationship of the projector with the projection area and arranged in a specified positional relationship with the specified space; and a controller for controlling a video to be projected from the projector to the projection area based on detection results by the position detecting sections of the plurality of position sensors.

In the above projector system, the relative positional relationship between the projector mobile in the specified space and the projection area where a video is projected from the projector is detected and the video projected from the projector is controlled based on the detected positional relationship, whereby a suitable video can be projected from the projector in accordance with a movement of the projector in the specified space. As a result, a video can be projected from the projector to an arbitrary projection area in the specified space.

BEST MODES FOR EMBODYING THE INVENTION

Figure 1:
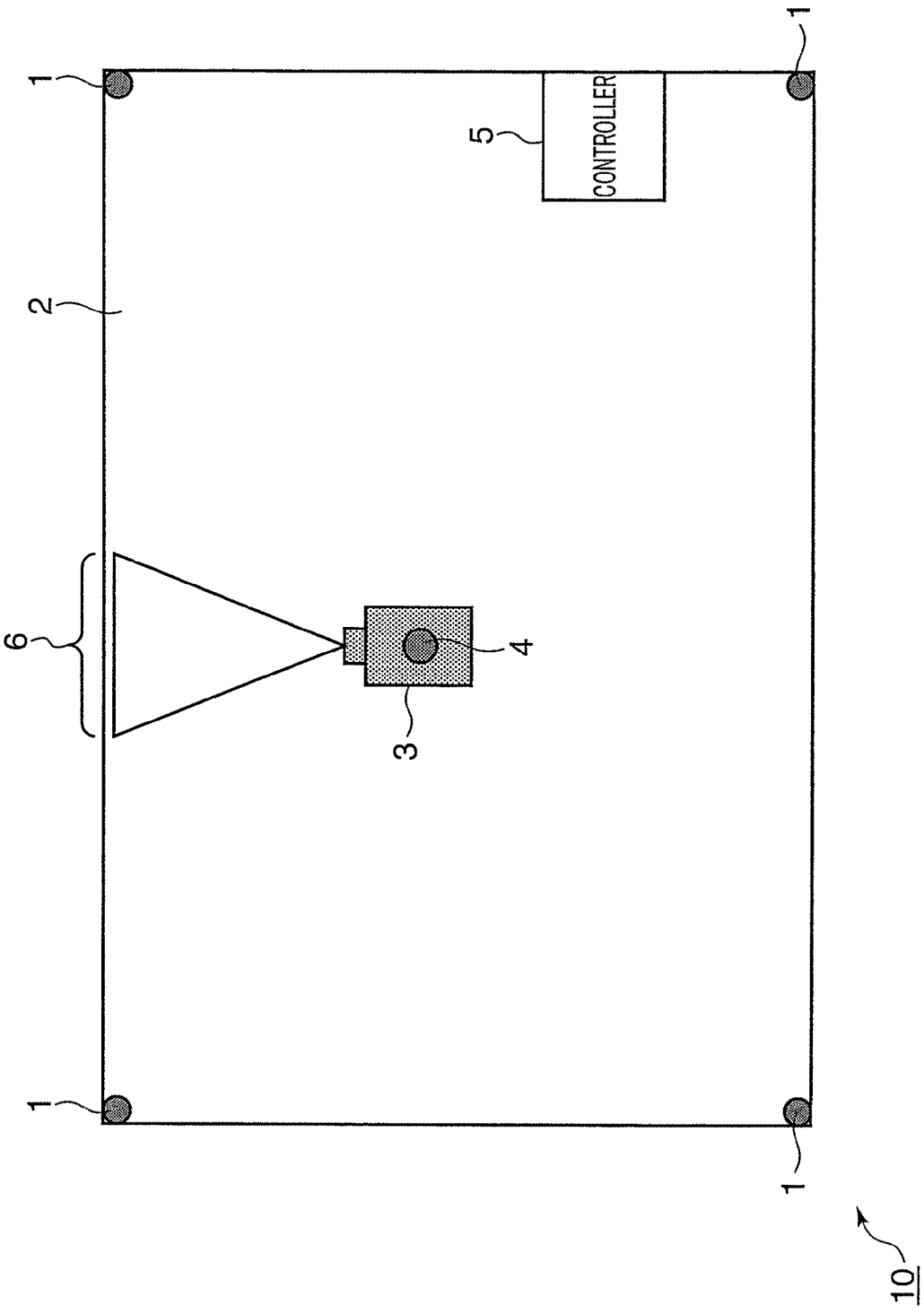
FIG. 1 is a diagram showing a schematic construction of a projector system according to a first embodiment of the invention.

Hereinafter, embodiments of the present invention are described with reference to the accompanying drawings. In the following description with reference to the drawings, same or similar elements are identified by same or similar reference numerals and are not repeatedly described in some cases.

First Embodiment

In a first embodiment of the present invention, a plurality of position sensors are installed in a space where a video is projected in order to control images of a projector upon displaying a video by a mobile small-size projector. A controller provided separately from the projector adjusts an image of the projector based on the position information of the projector from these position sensors.

FIG. 1 is a diagram showing a schematic construction of a projector system according to the first embodiment of the present invention. The projector system 10 according to this embodiment is provided with a mobile projector (projector) 3, fixed position sensors 1 installed in a three-dimensional display space 2 where a video is displayed by the projector 3, and a position sensor 4 mounted in the projector 3 and a controller 5.

In the projector system 10 according to this embodiment, a plurality of fixed position sensors 1 are installed in the display space 2 where a video is displayed as shown in FIG. 1. The projector 3 also includes the position sensor 4. A video from the projector 3 is displayed at an arbitrary position (e.g. irradiation position 6 in FIG. 1) in the display space 2. Projection conditions such as the focal point, magnification percentage, videos, image corrections and the like of the projector 3 are controlled by the controller 5 provided separately from the projector 3.

The fixed position sensors 1 are installed in the display space 2 of videos. The display space 2 is a three-dimensional space where videos can be projected in six directions of forward, backward, leftward, rightward, upward and downward directions. The fixed position sensors 1 installed in the display space 2 detect the position of the projector 3 in the display space 2. Electromagnetic waves are utilized for such position detection. The electromagnetic waves generated by the position sensor 4 mounted in the projector 3 may be detected by the fixed position sensors 1 or the electromagnetic waves generated by the fixed position sensors 1 may be detected by the fixed position sensors 1 again after being reflected by the position sensor 4 of the projector 3. Alternatively, radio waves generated from the position sensor 4 of the projector 3 by electromagnetic induction by the electromagnetic waves generated from the fixed position sensors 1 may be detected by the fixed position sensors 1. It is preferable to utilize reflection by the position sensor 4. This is because power required to generate electromagnetic waves by the position sensor 4 becomes unnecessary and the power consumption of the projector 3 can be reduced.

In this embodiment, the arrangement of the fixed position sensors 1 is important to precisely grasp the position of the projector 3 by the fixed position sensors 1. In the case of using a three-dimensional space as the display space 2, it is necessary to provide at least three fixed position sensors 1 and to measure three points by these three fixed position sensors 1. By the three-point measurements, the position of the projector 3 in the display space 2 can be grasped from position information from the three fixed position sensors 1. In this case, the three fixed position sensors 1 are preferably not arranged on the same straight line. This is because the position of the projector 3 in the three-dimensional display space 2 cannot be obtained if the three fixed position sensors 1 are arranged on the same straight line.

In this embodiment, in addition to the above position of the projector 3, the posture of the projector 3 in the display space 2 is detected and controlled. In order to control the posture of the projector 3, the projector 3 needs to include two or more sensing portions. The sensing portions are portions to be detected by the position sensor. In order to detect the inclination of the projector 3, the sensing portions are disposed at positions of the projector 3 spaced apart in forward and backward directions. The posture of the projector 3 can be detected by sensing these sensing portions by the fixed position sensors 1.

It is preferable to install the fixed position sensors 1 of this embodiment at such height positions equal to or higher than 170 cm or equal to or lower than 50 cm by avoiding a vertical range where a user carrying the projector 3 moves the projector 3 around, i.e. a range from the position of the user's eyes to the position of his knees. In the case of three-point measurements by the three fixed position sensors 1, it cannot be determined at which one of upper and lower sides of a plane defined by the three fixed position sensors 1 the projector 3 is present. In this case, if the position of the projector 3 is constantly fixed at either one of the upper and lower sides of the plane defined by the fixed position sensors 1, the position of the projector 3 can be fixed in the three-dimensional space. On the other hand, unless the position of the projector 3 is not fixed with respect to that plane, the position of the projector 3 cannot be determined. Thus, another fixed position sensor 1 is necessary. By the added other fixed position sensor 1, it is determined at which one of upper and lower sides of the plane defined by the former three fixed position sensors 1 the projector 3 is located.

Even in the case of using four or more fixed position sensors 1, the positional relationship of these plurality of fixed position sensors 1 is important. As described above, if all the fixed position sensors 1 are located on the same plane, it cannot be determined at which one of upper and lower sides of the plane defined by these fixed position sensors 1 the projector 3 is present. Accordingly, even in the case of four or more fixed position sensors 1, it has to be avoided that all the fixed position sensors 1 are arranged on the same plane. If the video display space 2 is complicated, e.g. if the display space 2 has a complicated shape, the number of the fixed position sensors 1 needs to be increased according to the display space 2. The controller 5 needs to recognize the display space 2 and the positions of the fixed position sensors 1 beforehand. Based on this information and the information on the position and posture of the projector 3, a video to be displayed by the projector 3 is determined and video information is transmitted to the projector 3, whereby the video can be display in the display space 2.

Next, the recognition of the display space 2 by the fixed position sensors 1 according to this embodiment is described. In this embodiment, the fixed position sensors 1 are preferably installed at unique points of the display space 2 in the case of forming the display space by arranging the fixed position sensors 1 in the three-dimensional display space 2. The unique points are locations with different spatial continuities such as corners of a room, boundaries between walls and a ceiling or between walls and a floor, the vicinity of a door and the vicinity of an obstacle to video display in the space. The characteristic of the display space 2 can be more easily grasped by installing the fixed position sensors 1 at the unique points.

In the case of defining the display space by the fixed position sensors 1, the display space can be more accurately defined by first performing a mapping process. Mapping is a process of causing the controller 5 to memorize the three-dimensional information of the display space. By installing the fixed position sensors 1 at the unique points of a room as the display space 2 and inputting the position information of the fixed position sensors 1 to the controller 5, a relationship of the display space 2 and the fixed position sensors 1 can be stored. In this case, if the number of the fixed position sensors 1 is small or the display space 2 is a complicated space, the user needs to correct or add the information of the display space 2. By performing the above mapping process, the relationship between the position of the projector 3 and the display space 2 can be precisely grasped, wherefore the control of the projector 3 by the controller 5 becomes easier and videos to be projected in the space can be more precisely controlled. Further, the user can create videos in the display space 2 by changing videos to be projected by the controller 5 based on the information of the display space 2.

If the display space 2 has a complicated shape, the number of the fixed position sensors 1 needs to be increased in conformity with this shape. If the display space 2 is very uneven or includes a complicated geography or land form, the controller 5 needs to recognize information on the place or geography by increasing the fixed position sensors 1.

Next, the correction of the video information in this embodiment is described. In this embodiment, it is possible to correct the distortion of a video and to correct the color thereof to a correct one by correcting the unevenness and color of a projection plane where the video is to be projected. First of all, color correction is described. In the case of color display by projecting lights of three RGB colors, the color of a video on the projection plane is determined by the intensities of reflected lights of the respective wavelengths from the projection plane. Even if the projection plane is colored or patterned, color correction is possible by correcting the color of the video in accordance with the color or pattern of the projection plane. In this embodiment, the color information of the projection plane is transmitted to the controller 5 by irradiating any one of lights of R, G, B lights between projected images and obtaining the reflected image using the fixed position sensors 1. By correcting an image to be projected based on this information, the video can be projected with the correct color without being influenced by the color and/or pattern of the projection plane. Similarly, concerning the unevenness of the projection plane, by projecting, for example, a lattice pattern to the projection plane and obtaining the projected video using the fixed position sensors 1, the unevenness information of the projection plane can be detected based on the distortion of the video. The controller 5 corrects a video based on this information, whereby the video can be projected without being influenced by the unevenness of the projection plane.

If the user projects videos while moving, the videos can be constantly corrected by intermittently mixing identification videos for measuring the color and shape of the projection plane and projecting it between the projected images. In order to project these identification videos at such a high speed that the user does not sense them, the light source needs to be switched at a high speed. To this end, the light source is preferably a laser or LED capable of high-speed switching. Particularly, lasers can emit narrow beams to distant positions and have a characteristic of being able to output scanning beams at a high speed to detect the unevenness of the projection plane by the principle similar to a three-dimensional scanner. It is possible to project videos free from distortion by performing high-speed beam scanning between videos and correcting images while recognizing the shape of the projection plane. Out of RGB lights, it is preferable to use blue light as the one for detecting the uneven shape. Since blue color has a low luminosity factor, identification videos for detection give less influence on other videos, wherefore the deterioration of videos caused by detection videos can be reduced.

The position and posture of the user can be detected by a method equivalent to the one for detecting the unevenness of the projection plane. By detecting a video projected from the projector 3 using the fixed position sensors 1, the position and posture of the projector 3 with respect to the projection plane can be detected. Particularly by detecting lattice-shaped identification videos or videos of beam scanning and correcting videos based on this information using the controller 5, correct videos can be projected onto the projection plane. By detecting distortions and blurring of videos caused by the movement of the projector 3 at a high speed using the fixed position sensors 1, videos can be corrected in conformity with the movement of the projector 3. By intermittently projecting these identification videos between projected images, distortions of videos caused by the position and posture of the projector 3 can be corrected in real time. Distortions of videos caused by both the posture of the projector 3 and the unevenness of the projection plane can be detected by detecting the projection plane using the fixed position sensors 1, and videos free from distortions can be projected by the controller 5 correcting the videos based on the detected information. If a method for projecting a video by beam scanning using a laser light source is used, no lens is necessary. Thus, it is possible to focus at an arbitrary position. Therefore, there is an advantage of being able to correct image distortions without causing any blooming.

The above identification videos may be detected by the position sensor 4 mounted in the projector 3 in addition to by the above fixed position sensors 1. In this case, the position sensor 4 is preferably a camera sensor. There are cases where the fixed position sensors 1 and the position sensor 4 of the projector 3 are simultaneously used and cases where the respective sensors are individually used. A relationship between the projection plane and videos can be correctly detected without being influenced by the position and posture of the projector 3 by obtaining identification signals using the fixed position sensors 1, and the miniaturization and lower power consumption of the projector 3 can be realized by reducing the processing burden of the position sensor 4 of the projector 3.

Figure 2:
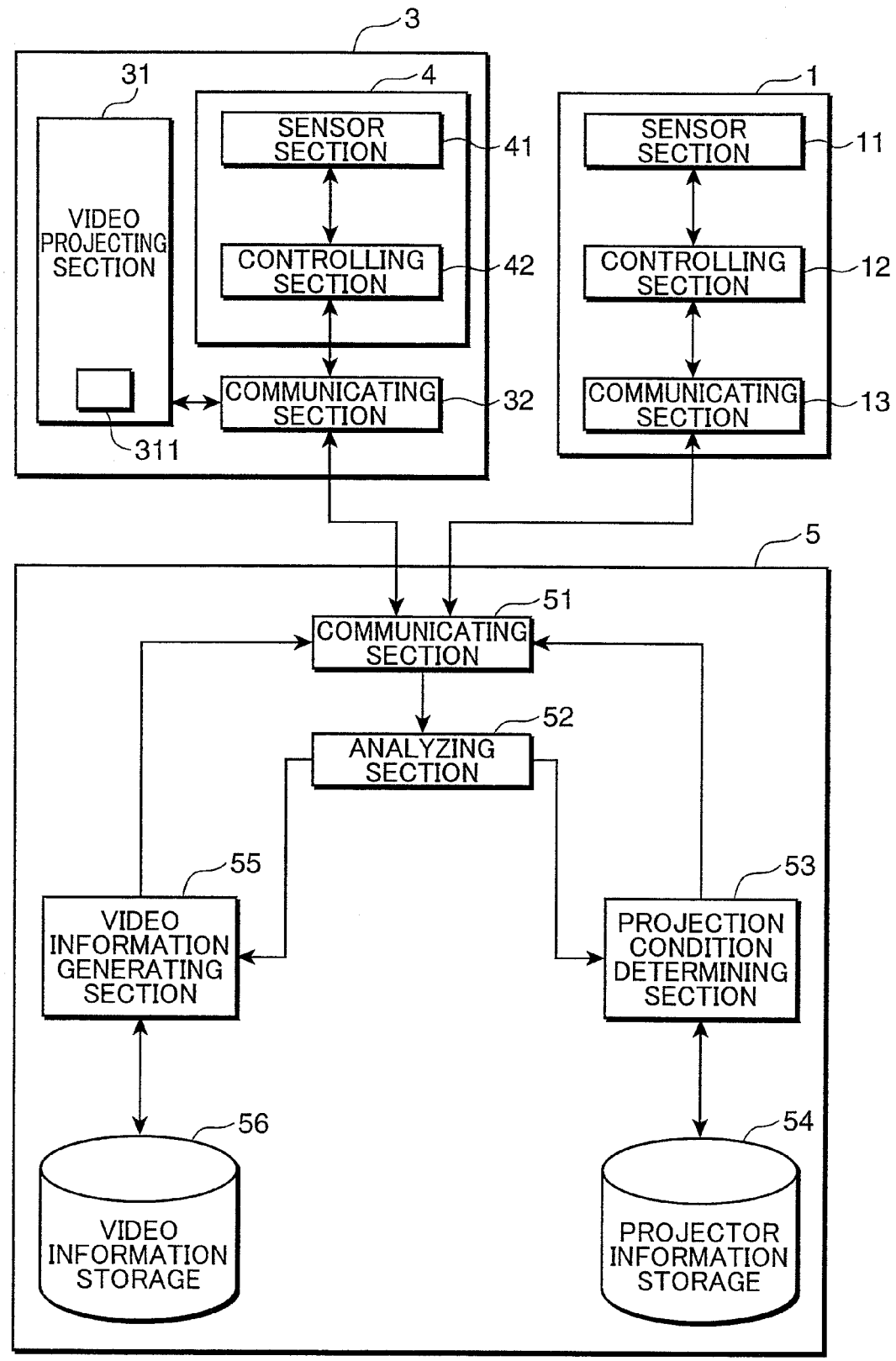
FIG. 2 is a block diagram showing a functional construction of the projector system of FIG. 1.

Next, with reference to FIG. 2, a functional construction of the projector system 10 according to this embodiment is described. As described above, in the projector system 10 according to this embodiment, the controller 5 analyzes the position and posture of the projector 3 using the detection results from the fixed position sensors 1 and the position sensor 4 of the projector 3, controls the projector 3 based on the analysis result and generates video information to be transmitted to the projector 3. Thus, the projector system 10 of this embodiment has, for example, the following functional construction. FIG. 2 is a block diagram showing the functional construction of the projector system 10 according to this embodiment.

Each fixed position sensor 1 of this embodiment includes a sensor section 11, a controlling section 12 and a communicating section 13 as shown in FIG. 2. The projector 3 of this embodiment includes the position sensor 4 comprised of a sensor section 41 and a controlling section 42, a video projecting section 31 for projecting a video using the video information transmitted from the controller 5 and a communicating section 32. Further, the controller 5 includes a communicating section 51, an analyzing section 52, a projection condition determining section 53, a projector information storage 54, a video information generating section 55 and a video information storage 56. Although a plurality of fixed position sensors 1 are arranged in the projector system 10 according to this embodiment, only one fixed position sensor 1 is shown in FIG. 2 to simplify the drawing.

The sensor sections 11 of the fixed position sensors 1 detect the position and posture of the projector 3 in the display space 2. For example, when the sensor sections 11 generate electromagnetic waves, some of the electromagnetic waves are reflected by the projector 3. The sensor sections 11 detect the position of the projector 3 by detecting these reflected waves. Of course, the sensor sections 11 may detect the position of the projector 3 by detecting electromagnetic waves generated by the projector 3 instead of those generated by themselves. The sensor sections 11 also detect the identification videos projected from the projector 3 to correct video information projected from the projector 3. The sensor sections 11 detect the identification videos reflected by the projection plane and transmits them to the controller 5 using the communicating sections 13. Although the detection on the position of the projector 3 and the detection of the identification videos from the projector 3 are both performed by the sensor sections 11 here, it is, of course, all right to separately provide sensor sections for detecting the position of the projector 3 and sensor sections for detecting the identification videos from the projector 3.

The controlling sections 12 of the fixed position sensors 1 convert the detection results from the sensor sections 11 into digital signals by controlling the sensor sections 11 and transmit them to the controller 5 using the communicating sections 13. The communicating sections 13 are capable of wired or wireless communication with the controller 5 to enable data communication between the fixed position sensors 1 and the controller 5.

The sensor section 41 of the position sensor 4 of the projector 3 reflects the electromagnetic waves generated by the sensor sections 11 of the fixed position sensors 1 or generates electromagnetic waves itself. The sensor sections 11 detect the position of the projector 3 by detecting the electromagnetic waves from the sensor section 41. Two or more sensing portions are connected to the sensor section 41. In the case of detecting the posture of the projector 3 by the fixed position sensors 1, the fixed position sensors 1 can also detect the posture of the projector 3 by detecting the electromagnetic waves from the respective two or more sensing portions. Similar to the sensor sections 11, the sensor section 41 also detects the identification videos projected from the projector 3. The sensor section 41 detects the identification videos reflected by the projection plane and the controlling section 42 transmits the detection result to the controller 5 using the communicating section 32. Here as well, it is, of course, all right to separately provide a sensor section for detecting the position of the projector 3 and a sensor section for detecting the identification videos from the projector 3.

Similar to the controlling sections 12, the controlling section 42 in the position sensor 4 of the projector 3 converts the detection result from the sensor section 41 into a digital signal by controlling the sensor section 41 and transmits it to the controller 5 using the communicating section 32. The communicating section 32 is capable of wired or wireless communication with the controller 5 to enable data communication between the projector 3 and the controller 5.

The communicating section 51 of the controller 5 is capable of wired or wireless communication with the communicating sections 13 of the fixed position sensors 1 and the communicating section 32 of the projector 3 to enable data communication between the fixed position sensors 1 and the controller 5 and between the projector 3 and the controller 5.

The analyzing section 52 of the controller 5 obtains the detection results from the fixed position sensor 1 and the position sensor 4 of the projector 3 using the communicating section 51 and analyzes the position and posture of the projector 3 using these results. The analyzing section 52 further obtains the identification videos from the projector 3 detected by the fixed position sensors 1 and the position sensor 4, and analyzes the states of the projection plane such as the color, unevenness, pattern and the like of the projection plane where videos projected from the projector 3 are displayed. Although the analysis on the position and posture of the projector 3 and the analysis on the states of the projection plane are both performed by the analyzing section 52 here, it is, of course, all right to separately provide an analyzing section for analyzing the position and posture of the projector 3 and an analyzing section for analyzing the states of the projection plane.

The projection condition determining section 53 of the controller 5 sets projection conditions such as the focal point, magnification percentage, videos, image corrections and the like of the projector 3 based on the analysis results from the analyzing section 52. The projection condition determining section 53 is provided with the projector information storage 54. The projector information storage 54 stores the projection conditions set by the projection condition determining section 53, the positions of the fixed position sensors 1 and the positional relationship thereof obtained beforehand, three-dimensional information indicating the three-dimensional shape of the display space 2 and the like obtained by the mapping process, the position and posture of the projector 3 obtained from the analyzing section 52, etc. The projection condition determining section 53 sets the projection conditions such as the focal point, magnification percentage, videos corrections and the like of the projector 3 by referring to projector information stored in the projector information storage 54. The projection condition determining section 53 transmits the projection conditions to the projector 3 using the communicating section 51.

The video information generating section 55 of the controller 5 generates video information to be transmitted to the projector 3 based on the analysis results from the analyzing section 52. The video information generating section 55 generates the video information to be transmitted to the projector 3 from the video information (original video information) obtained beforehand in accordance with the position and posture of the projector 3 from the analyzing section 52 and the states of the projection plane such as the color, unevenness and the pattern of the projection plane where videos from the projector 3 are displayed. The video information generating section 55 is provided with the video information storage 56 for storing the video information (original video information) obtained beforehand. The video information storage 56 may store all the video information to be projected by the projector 3 beforehand or the video information may be suitably transmitted to the video information storage 56 from the outside of the controller 5. The video information generating section 55 transmits the generated video information to the projector 3 using the communicating section 51.

The projector 3 obtains the projection conditions and the video information from the controller 5 using the communicating section 32 and projects the videos using the video projecting section 31. The video projecting section 31 is provided with an identification video generating section 311 and the projector 3 can project the identification videos generated by the identification video generating section 311.

The analyzing section 52, the projection condition determining section 53 and the video information generating section 55 of the controller 5 can be integrated on the same semiconductor substrate.

Figure 3:
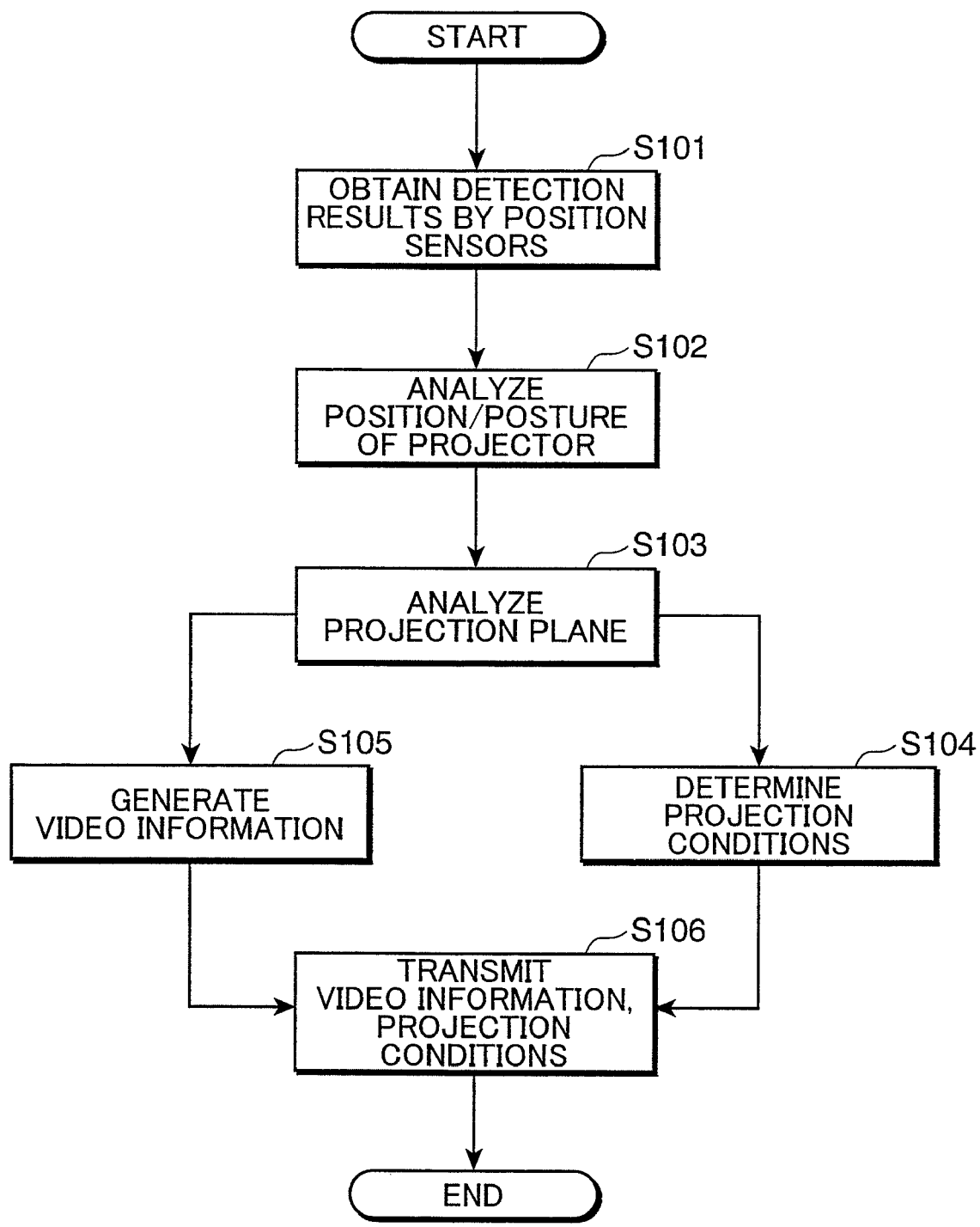
FIG. 3 is a flow chart showing the procedure of a video projecting operation by a controller.

FIG. 3 shows the procedure of a video projecting operation by the controller 5 in the projector system 10 according to this embodiment. In FIG. 3, the controller 5 obtains the detection results from the fixed position sensors 1 and the position sensor 4 of the projector 3 using the communicating section 51 (Step S101). The analyzing section 52 analyzes the position and posture of the position sensor 3 using these detection results (Step S102).

The analyzing section 52 further analyzes the states of the projection plane such as the color, unevenness and the pattern of the projection plane, where videos projected from the projector 3 are displayed, using reflected videos of the identification videos from the projector 3 by the projection plane detected by the fixed position sensors 1 and the position sensor 4 (Step S103).

The projection condition determining section 53 determines the projection conditions such as the focal point, magnification percentage, videos, image corrections and the like of the projector 3 based on the analysis results from the analyzing section 52 (Step S104). On the other hand, the video information generating section 55 generates the video information to be transmitted to the projector 3 based on the analysis results from the analyzing section 52 (Step S105).

The projection condition determining section 53 transmits the projection conditions set in Step S104 to the projector 3 using the communicating section 51, and the video information generating section 55 transmits the video information generated in Step S105 to the projector 3 using the communicating section 51 (Step S106).

In this way, the video projecting operation is performed by the controller 5 and the projector 3 projects videos based on these conditions and information.

Second Embodiment

Figure 4:
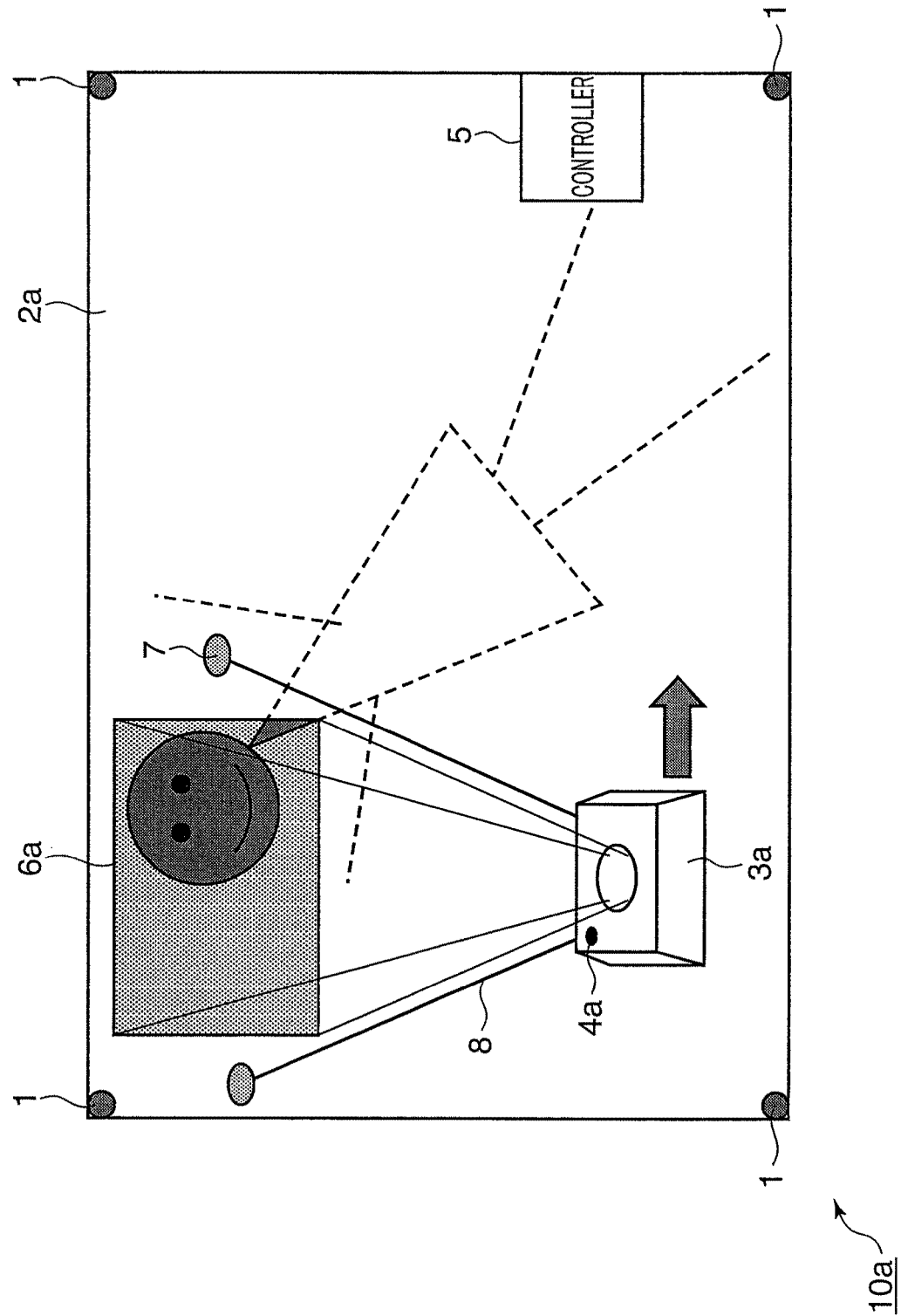
FIG. 4 is a diagram showing a schematic construction of a projector system according to a second embodiment of the invention.

Next, a second embodiment of the present invention is described. This embodiment is an example in which the projector of the above first embodiment is applied to a mobile projector portable by a user. According to this embodiment, it becomes possible to display a video at an arbitrary position without selecting an installation position of the projector by utilizing a light and small mobile projector. FIG. 4 shows a schematic construction of the projector system according to this embodiment. FIG. 4 shows a state of projection by the mobile projector. This embodiment is described below with reference to FIGS. 1 to 3.

A projector system 10a according to this embodiment is, as shown in FIG. 4, provided with a mobile projector 3a, fixed position sensors 1 installed in a three-dimensional display space where a video is displayed by the projector 3a, a position sensor 4a mounted in the projector 3a and a controller 5.

In the projector system 10a of this embodiment, a video projected on a projection plane (irradiation position) 6a of the display space is determined by a relative relationship with the fixed position sensors 1, and the mobile projector 3a projects an image based on this relative relationship. Thus, a video can be precisely projected at the irradiation position even in the case of shaking of the projector 3a, a change in the irradiation position and movements of a user carrying the projector 3a. In other words, the size and position of the projected image are determined by the fixed position sensors 1, and the focal point and magnification percentage of the projector 3a are automatically calculated from the position of the projector 3a. If the projector 3a itself is moved, a video changes according to the position and posture of the projector 3a and a target video is projected on the projection plane 6a. By controlling the video to be projected in the display space by the controller 5, the entire image prepared beforehand can be displayed in conjunction with the projecting position of the projector 3a.

Since the image to be displayed in the display space are controlled by the fixed position sensors 1 and the controller 5, a high-speed processing is possible and there is no likelihood of image blurring and blooming caused by the shaking of the projector 3a. In the case of using the projector 3a while carrying it around, even if the position of the projector 3a drastically changes, it is instantaneously possible to determine a video by detecting the position and posture of the projector 3a and to project the video by transmitting it to the projector 3a. Further, the miniaturization and lower power consumption of the projector 3a are possible since the projector 3a does not have functions of making these detection, analysis and image processing.

As a result, a display location of the portable small-size projector spreads into a three-dimensional space and a video can be projected in a free location such as a plurality of walls, a ceiling and a floor. Although images of the projector 3a can be displayed only in a limited area, videos can be displayed in the entire three-dimensional display space by moving the display position of the projector 3a. A known conventional method is such that display images are read by a projector for image correction and blurring correction, but the functions of the projector increases and it is difficult to realize miniaturization and lower power consumption and to realize a portable small-size projector by the conventional method.

In contrast, in this embodiment, an image correction, a focus correction and a posture correction are performed using the detection results by a plurality of fixed position sensors 1 installed in the three-dimensional display space. Further, these controls are performed by the controller 5 provided separately from the projector 3a, whereby the projector 3a itself needs not perform these controls. As a result, the functions of the projector 3a can be drastically reduced. This enables the miniaturization, lighter weight and lower power consumption of the projector 3a and enables the projector 3a to freely project images in the three-dimensional space. The lower power consumption of the projector 3a is very effective not only in miniaturizing the projector 3a, but also in reducing heat generation. It is essential for the mobile projector to reduce the temperature of the apparatus since videos are projected while carrying the mobile projector around, wherefore its practical effect is large.

In this embodiment, the positional information of the projector 3a can be detected by detecting the positions of the fixed position sensors 1 using the position sensor 4 mounted in the projector 3a itself. It can also be done by detecting the position of the projector 3 using the fixed position sensors 1. Either method can be employed. If the both types of sensors simultaneously detect the other types, the positional accuracy of the projector 3a is improved. This point similarly holds for other embodiments.

In this embodiment, the posture of the projector 3a can also be detected by detecting the position of the projector 3a using the fixed position sensors 1 installed in the display space and simultaneously detecting the projection plane 6a of the projector 3a. Based on these pieces of information, an image correction is performed for the projector 3a and a stable video can be projected without being blurred even if the video is projected while the projector 3a is carried around. It is, of course, all right to detect the projection plane 6a of the projector 3a using the position sensor 4a mounted in the projector 3a.

In this embodiment, the posture of the projector 3a is more easily controlled by mounting an infrared laser and a position sensor in the projector 3a. An infrared laser light 8 emitted from the projector 3a is irradiated to a display surface 2a to form a display spot 7. The posture of the projector 3a can be detected by a positional relationship of the display spot 7 and the projector 3a, and a screen can be corrected based on this information. Further, the position and posture of the projector 3a can be detected by observing infrared spots on the display surface 2a through the use of a plurality of infrared laser spots or a line-shaped infrared laser light or through the scanning of an infrared laser light.

Third Embodiment

Figure 5:
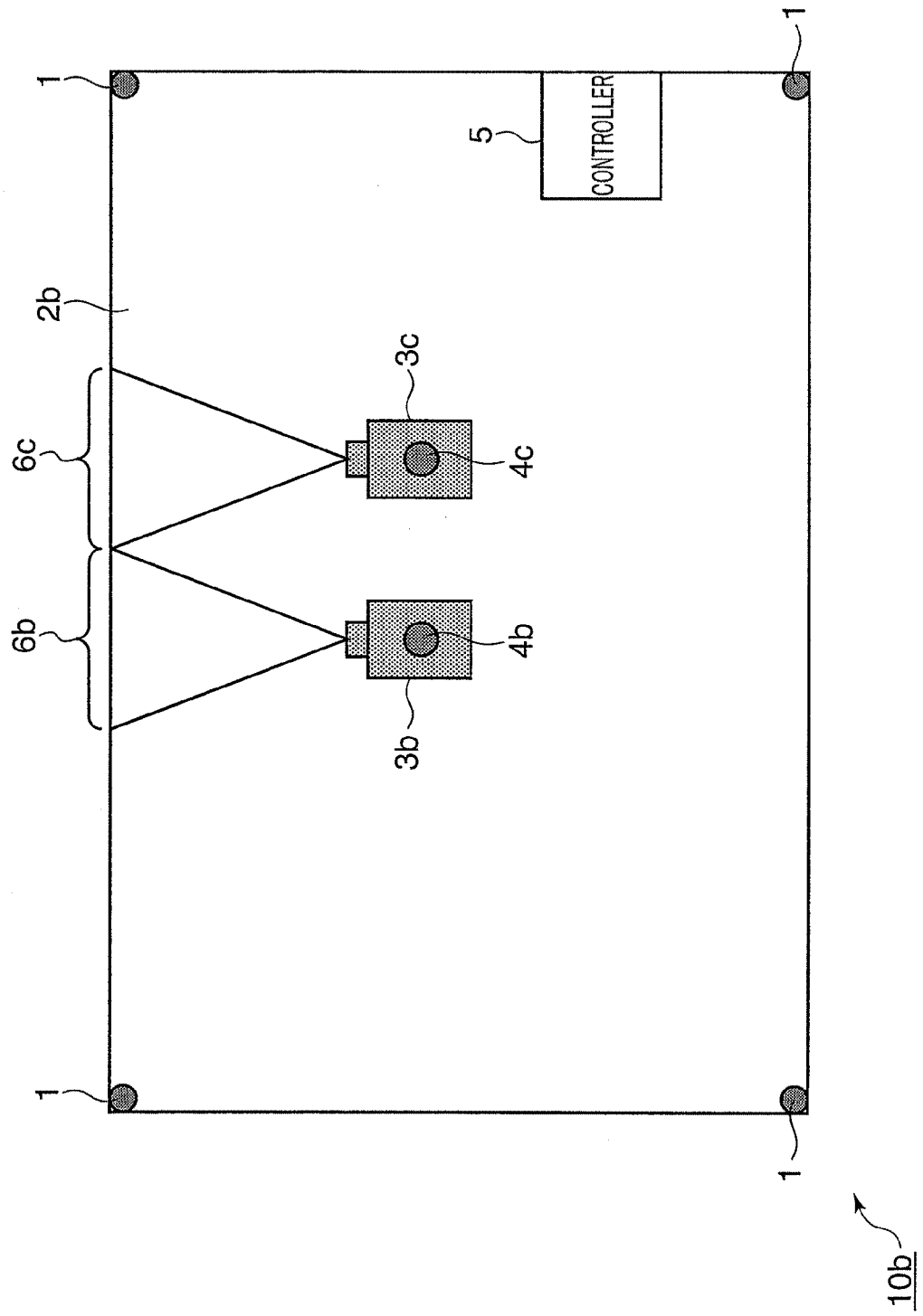
FIG. 5 is a diagram showing a schematic construction of a projector system according to a third embodiment of the invention.

Next, a third embodiment of the present invention is described. This embodiment is an example including a plurality of projectors of the above first embodiment. FIG. 5 shows a schematic construction of a projector system according to this embodiment. FIG. 5 shows a state of projection by the plurality of projectors. This embodiment is described below with reference to FIGS. 1 to 3.

A projector system 10b according to this embodiment is, as shown in FIG. 5, provided with mobile projectors 3b, 3c, fixed position sensors 1 installed in a three-dimensional display space 2b where videos are displayed by the projectors 3b, 3c, a position sensor 4b mounted in the projector 3b, a position sensor 4c mounted in the projector 3c and a controller 5.

In the projector system 10b shown in FIG. 5, position information of the mutual projectors 3b, 3c is important in the case where the plurality of projectors 3b, 3c project videos to corresponding irradiation positions 6b, 6c. In this embodiment, the positions of the projectors 3b, 3c are detected by mounting the position sensors 4b, 4c in the respective projectors 3b, 3c as shown in FIG. 5. By detecting the positions of the projectors 3b, 3c, the combination, interference and the like of videos projected from the plurality of projectors 3b, 3c can be accurately realized.

Figure 6:
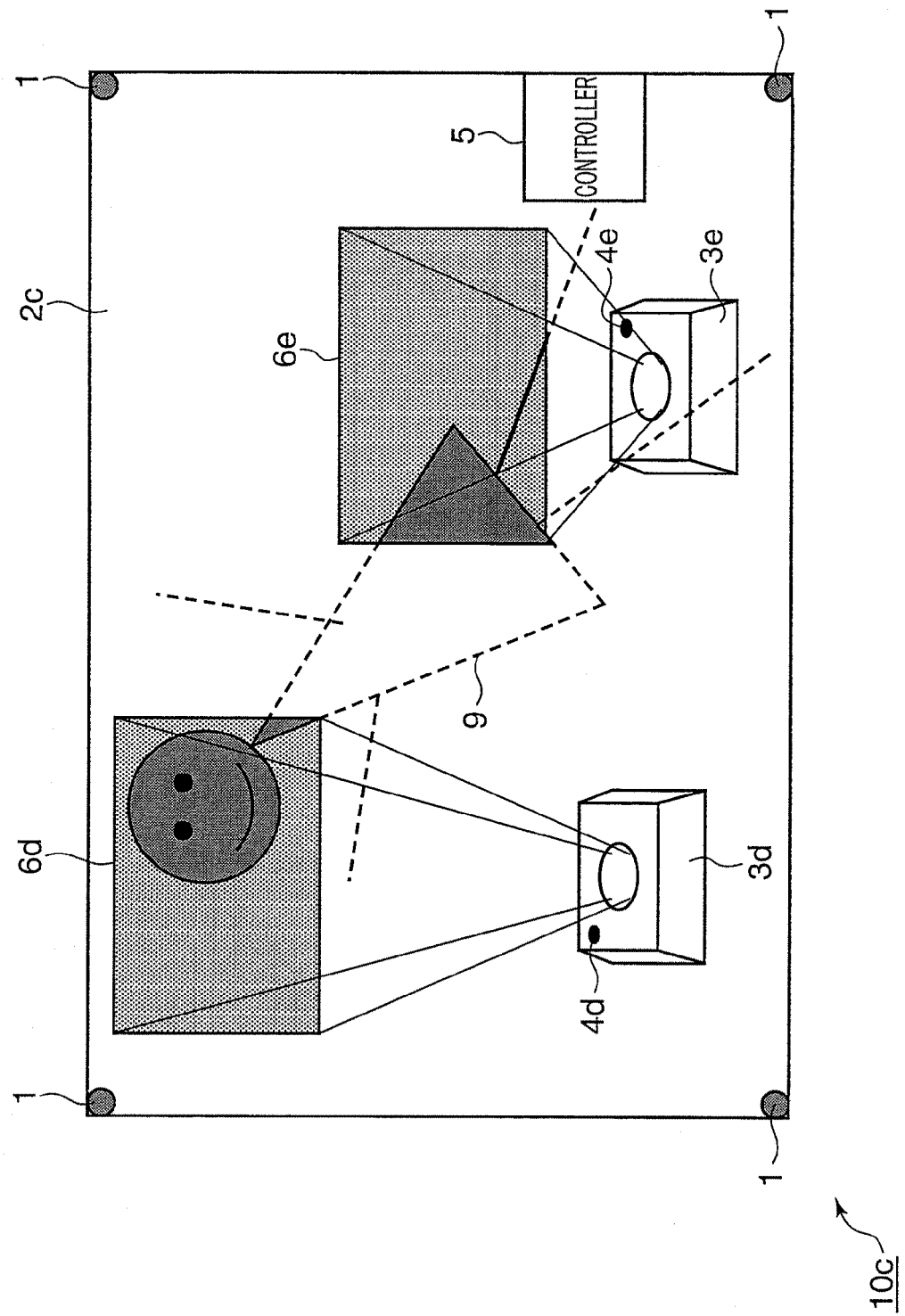
FIG. 6 is a diagram showing a state where projected images by a plurality of projectors are combined on a display surface 2c.

FIG. 6 shows a state of actually combining projected images on a display surface 2c by a plurality of projectors 3d, 3e. In a projector system 10c of FIG. 6, a display image 9 on the display surface 2c is determined by a relative positional relationship of fixed position sensors 1 and the projectors 3d, 3e. Thus, the projected images on projection planes 6d, 6e of the plurality of projectors 3d, 3e can be accurately combined. This characteristic of using the plurality of projectors 3d, 3e can realize various applications such as the combination of images, the combination of a background image and an emphasized image, luminance improvement and display area enlargement.

Here, characteristics which should be possessed by the respective projectors in the case of using the plurality of projectors are described below.

The area of a projected image which one projector can display at once depends on the luminance of the projector. In order to display a large area, a high-luminance projector is necessary. In the case of a mobile projector, the realization of higher luminance is difficult since power consumption is suppressed. In such a case, by displaying projector videos in a dark display space such as a dark room, dynamic large videos can be enjoyed even with a projector having a low luminance. In order to enjoy videos by a mobile projector in a dark display space, a user himself needs to grasp positions in the display space to a certain degree. In this case, the problem can be solved by detecting at which position in the display space the projector is present. By providing the mobile projector with a function of displaying positions in the display space to the user based on information from the fixed position sensors, videos can be safely enjoyed even in the dark space.

In the case of using a plurality of projectors, the positional relationship of the respective projectors, the irradiation positions of the respective projectors and the mutual recognition of videos and the projectors are necessary. A method for identification using the wavelengths of RGB lights projected from the respective projectors is proposed in order to recognize the projectors from the projected images in the case of using the plurality of projectors. In this embodiment, each projector has at least lights of three primary colors of RGB, wherein at least two of these three primary color wavelengths are set to differ from each other. By detecting the wavelengths of the projected images using the fixed position sensors in this way, the projectors projecting videos can be recognized. A wavelength difference between the projectors is preferably 0.1 nm or larger. This is because the wavelength difference identified by an optical filter is about 0.1 nm. The wavelength difference is preferably 0.5 nm or smaller in a read region and 5 nm or smaller in blue and green regions. If the wavelength difference between the projectors increases, color differences become notable in the case of combining videos between the projectors, thereby deteriorating the quality of a combined image. The wavelength difference between the projectors is preferably 5 nm or smaller also to prevent this problem.

Laser light sources are preferably used as RGB light sources in the case of recognizing the projectors based on the wavelength difference. Since lasers have narrow wavelength spectra, an oscillation wavelength difference can be identified even at an interval of 0.1 nm or smaller. Since lamp light sources and LED light sources have wavelength spans of about 10 nm, the wavelength difference needs to be increased and color differences caused by the wavelength difference become notable.

Either green or blue light source is preferable as a light source used to identify the projectors. Since red color has a large variation of luminosity factor caused by a wavelength variation, the range of different wavelengths is limited to about several nm. Thus, the number of the projectors is limited. In contrast, since green and blue colors have smaller variations of luminosity factor caused by a wavelength variation, the ranges of usable wavelengths are wider, which is preferable. Further, with a green light source, a color change recognized by human is sluggish in the case of a wavelength change. Thus, even in the case of superimposing videos of a plurality of projectors having different wavelengths, color differences are not recognized and a combined image with high quality can be realized.

A method for incorporating individual identification information into a video signal may be employed as another method for identifying a plurality of projectors. There is a method for identification by projecting individual identification videos between videos and recognizing them using fixed position sensors. Further, the projectors can be detected using videos by changing the frequency, phase, RGB order and color arrangement of video signals.

The wavelength difference can be detected by using fixed position sensors and a narrow-band wavelength filter and selecting a transmission wavelength by means of the wavelength filter to detect the wavelength difference of projector light sources.

Although the mobile projectors are used as the plurality of projectors in this embodiment, it is also effective to use a fixed projector in combination with the mobile projector. If a background image is projected in the display space by the fixed projector and users project images using the mobile projectors in this space, new images can be displayed by combining both images.

By mounting an infrared laser (or LED) in the projector to detect the irradiation position of the projector, the posture of the projector can be more precisely detected. By irradiating a plurality of infrared beams in the display space and detecting the positions of the infrared beams incident on the display surface using the fixed position sensors, the posture of the projector can be detected together with the position information of the projector. By using the infrared laser, the irradiation position can be detected without being noticed by the user. Further, since there is a large wavelength difference between infrared radiation and other lights, e.g. for illumination, there is an advantage of being able to precisely detect the irradiation position without being influenced by outside light and projected images. Camera sensors are desirably used as the fixed position sensors in this case.

If a plurality of infrared laser beams are irradiated not only in an irradiation direction, but also in lateral direction, vertical direction and other directions, blind spots from the fixed position sensors no longer exist and the posture of the projector can be more precisely grasped.

Since the posture information of the projector can be obtained before projecting an image if the infrared laser is used, there is also an advantage of being able to adjust a video of the projector before projection.

In the case of using a plurality of projectors, the postures and positions of the respective projectors can be individually detected by irradiating the respective infrared beams in a time sharing manner. A mutual relationship of the respective projectors can be controlled by detecting the positions and postures of the respective projectors and determining videos based on the detected information by means of the controller.

Fourth Embodiment

Figure 7A:
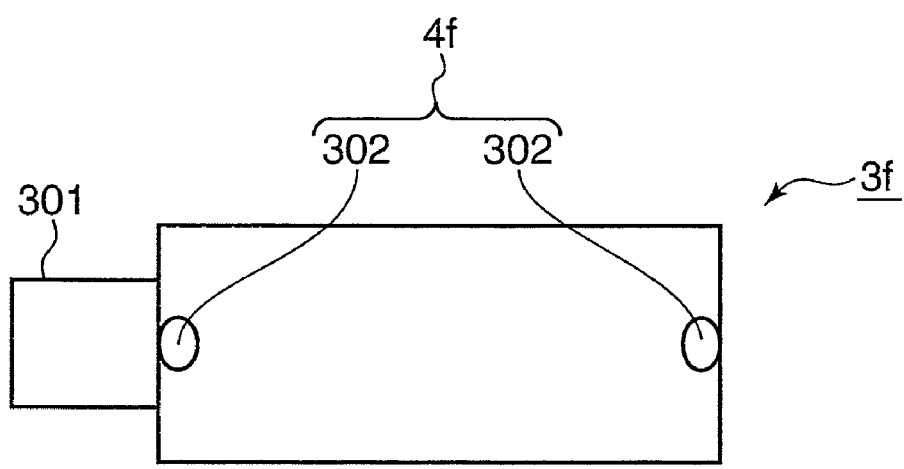
FIGS. 7A and 7B are a plan view and a side view in section showing a schematic construction of a projector used in a projector system according to a fourth embodiment of the invention.
Figure 7B:
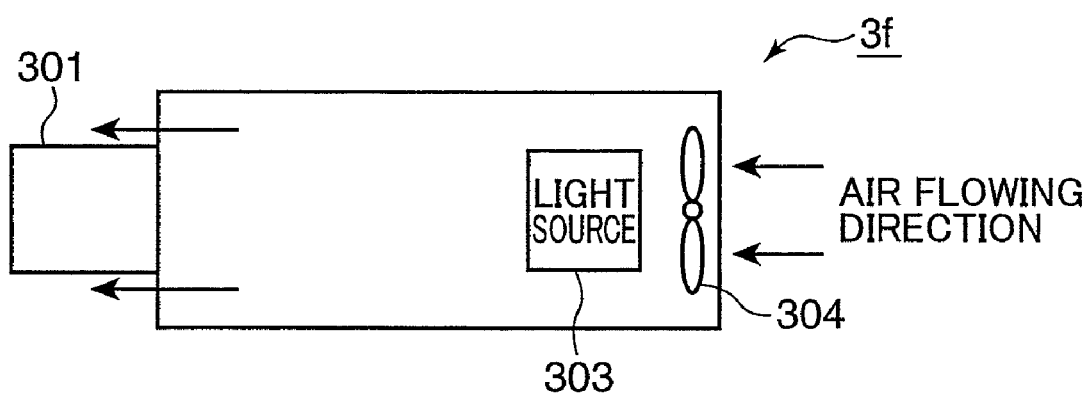

Next, a fourth embodiment of the present invention is described. This embodiment is an example in which a projector using an RGB visible light laser is used as the projectors of the above first to third embodiments. FIGS. 7A and 7B are a plan view and a side view in section showing a schematic construction of a projector according to this embodiment.

As shown in FIG. 7A, a position sensor 4f including two sensing portions 302 is mounted in a projector 3f according to this embodiment and the two sensing portions 302 are arranged at the front and rear sides of the projector 3f. Similar to the fixed position sensors 1, the two sensing portions 302 have a function of generating electromagnetic waves or reflecting electromagnetic waves from the fixed position sensors 1. By including the two or more sensing portions 302, the posture information of the projector 3f can be detected by the fixed position sensors 1. In order to improve the accuracy of position information used for posture control, the positions of the two sensing portions 302 are preferably distant from each other. Accordingly, in this embodiment, the two sensing portions 302 are arranged at the front and rear sides of the projector 3f.

In the projector 3f according to this embodiment, an RGB laser light source is used as a light source 303, a projection lens 301 is disposed in a front part of the projector 3f and a fan 304 for radiating the heat of the light source 303 is provided in a rear part as shown in FIG. 7B. Since the laser has high electro-optical conversion efficiency, a small-size and high-luminance projector can be realized. Further, due to high electro-optical conversion efficiency, battery drive useful to a mobile projector is possible. A temperature increase of the projector 3f itself, which is problematic when a user carries the projector 3f around, can be drastically reduced. Further, since the light source 303 can be instantaneously started, there is an advantage of being able to immediately display an image in a display space.

It is preferable to dispose the fan 304 in the rear part of the projector 3f and to set an air flowing direction by the fan 304 to a direction from the rear part to the front part of the projector 304. Since the user uses the projector 3f while carrying it around, no vent holes can be formed in the side, upper and lower surfaces of the projector 3f due to handling by the user. Since hot air may be possibly blown to the user in a structure of blowing air out from the rear part, a preferable structure is such as to breathe air from the rear part and exhaust it to the front part.

In this embodiment, a method for displaying videos by scanning RGB laser beams can be utilized. A video can be displayed by two-dimensionally scanning laser beams approximate to Gaussian beams using small-size MEMS mirrors and simultaneously modulating the intensities of the beams. By using the beam scanning method, a lens system can be simplified and a small-size projector can be realized. The beam scanning method enables the projection of a video free from blooming regardless of a distance from the projector, i.e. at any distance. Thus, it is no longer necessary to control the projector and a video projection distance, wherefore a video free from blurring can be projected by a very simple control. There is an additional advantage of not being influenced by the unevenness of the projection plane.

In this embodiment, a video can be projected in a wider area by changing the position of the projector with time. Video projection is possible in the entire display space by projecting a video in synchronism with the projection location. In the case of projection while holding the projector by hand, a projected image changes with time. In the case of the projector using the laser light source, the generation of speckle noise due to interference can be drastically reduced by changing the projecting position with time. In this way, the image quality of a video can be improved. The projecting position can be changed with time by projecting a video while the user holds the projector by hand. Further, speckle noise can be reduced by changing the optical system of the projector with time. In this case, an image needs to be corrected in conformity with the vibration of the optical system. Besides, a projector using an LED is also applicable for the same reason as the laser projector.

In this embodiment, a video projection method by which fixed position sensors, a controller and a space where a video can be displayed are prepared and a user carrying a mobile projector around in this space freely projects videos can be employed as a video projection method using a mobile projector. The projector carried by the user in the video projection space has the position and posture information thereof detected by the fixed position sensors. Based on this information, the controller determines video information and transmits this video information to the projector. The projector can freely project videos in the display space based on the video information from the controller. If videos of a fixed projector, still images, three-dimensional objects, a background and the like are further provided in the video display space, the user can enjoy combining images of his own projector with images or three-dimensional objects in the video display space. Video projection from the mobile projector toward still objects such as a poster, advertisement goods and other objects or moving images enables moving images and still images relating to still objects to be projected on objects. Since the position of the projector is detected by the fixed position sensors, the focal point and magnification percentage of the video of the projector, the position of the image and the like can be precisely controlled to irradiate the still object, a combined video with the still object can be enjoyed. If a plurality of users are present in the same video display space, it is also possible to create a new video by combining a plurality of projected images through the control of the respective projectors by the controller.

The position sensor mounted in the mobile projector itself is preferably a low power consuming sensor such as a transmitter or an infrared LED to be detected by the fixed position sensors. Further, receivers, image sensors, infrared sensors or the like for detecting the position of the projector can be utilized as the fixed position sensors. On the contrary, by using transmitters, infrared light sources or the like as the fixed position sensors and providing a sensor with a receiver function as the position sensor mounted in the projector, the positions of the fixed position sensors can be detected by the projector.

As a method for utilization of the projector, it is also possible to constitute a video such that the video of the projector illuminates an actually existing object like a flashlight. Since the positional relationship of the video in the display space is fixed, it is possible to constitute such a video as if an actually existing background were partly observed by a flashlight by changing the video to be projected in conformity with the display position of the projector.

The point tracking by image processing of a sensor camera or the like can also be utilized as the fixed position sensor. Since the mobile projector irradiates laser light, it is easy to detect a luminescent spot and a three-dimensional position can be measured in real time by preparing two or more fixed position sensors. In the case of utilizing a mobile projector using a laser as a light source, RGB monochromaticity is strong. Thus, by disposing a wavelength filter for transmitting light of a specific wavelength, e.g. at least any one of red light of 640 nm, blue light of 450 nm and green light of 530 nm on the entire surface of the sensor camera, the position of the projector can be precisely detected by suppressing ambient noise light.

Sensors using ultrasonic waves can also be utilized as the fixed position sensors. If ultrasonic waves are used, position detection beyond an obstacle is possible. By providing the projector main body with an ultrasonic wave generator and providing the fixed position sensors with a mechanism for detecting the ultrasonic waves generated by the projector, the position of the projector can be precisely obtained. Further, an inexpensive construction with lower power consumption is possible.

It is also effective to use different sensors in combination as the fixed position sensors. Camera sensors and photosensors can detect positions with high accuracy, but have blind spots which cannot be detected since they detect lights. By combining them with electromagnetic sensors or ultrasonic sensors, there are no more blind spots of detection and positions can be detected with high accuracy.

It is also effective for the fixed position sensor to detect normal electromagnetic waves. The projector is provided with a wireless transmitting/receiving function to obtain video information from the controller. By receiving this signal by the fixed position sensors, the position of the projector can be easily detected. It is also possible to detect the position of the projector.

In the case of using sensor cameras, photosensors or the like sensors for detecting the light of the projector as the fixed position sensors, the position cannot be detected in some cases by the light being shielded by the body of the user holding the projector. In order to prevent this, it is necessary to provide at least one fixed position sensor on a projection plane, onto which videos can be projected by the projector. Since the light of the projector can be detected from the projection plane facing the projector, there is no blind spot created by the user's body and the position of the projector can be constantly detected.

Fifth Embodiment

Figure 8:
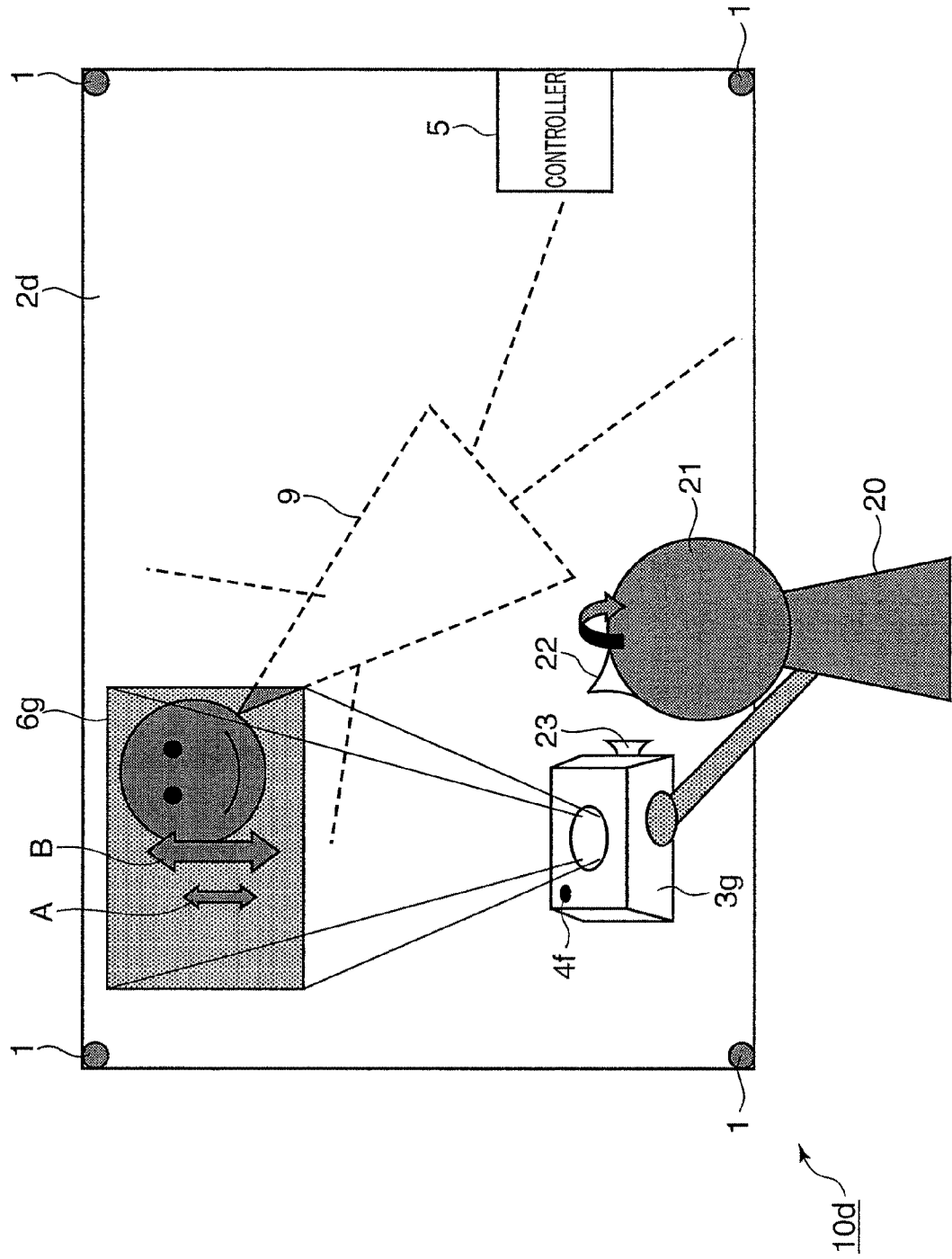
FIG. 8 is a diagram showing a schematic construction of a projector system according to a fifth embodiment of the invention.

Next, a fifth embodiment of the present invention is described. This embodiment is an example in which a video to be projected from a projector is generated in conformity with the movement of the viewpoint of a user by utilizing visual information from the user holding the mobile projector. FIG. 8 shows a schematic construction of a projector system according to this embodiment. FIG. 8 shows a state where the user holds the mobile projector to project a video to a projection plane.

A projector system 10d according to this embodiment is, as shown in FIG. 8, provided with a mobile projector 3g, fixed position sensors 1 installed in a three-dimensional display space where a video is displayed by the projector 3g, a position sensor 4f mounted in the projector 3g, a head sensor 22 placed on a head 21 of a user 20 and a speaker 23 mounted in the projector 3g.

In the projector system 10d shown in FIG. 8, an image to be displayed on a display surface 2d is determined by a positional relationship of the fixed position sensors 1 and the mobile projector 3g. In addition to such a use environment, the head sensor 22 is provided to detect the movement of the head 21 of the user 20. The head sensor 22 detects the movement of the viewpoint of the user 20.

For example, if the viewpoint moves in a vertical direction shown by A in FIG. 8 with respect to an image projected on a projection plane 6g, moving images of the projected image are moved in a vertical movable range shown by B in FIG. 8 larger than the movement of the viewpoint in response to the movement of the viewpoint. Thus, the user 20 develops an illusion that the space itself is moving. By changing moving images in conformity with the change of the viewpoint resulting from the movement of the body of the user 20, such a sensory video as if the display space were largely moving can be realized.

There are several methods for constructing the head sensor 22 for detecting the movement of the head 21 of the user 20. A first method is an acceleration sensor. By placing a small-size acceleration sensor on the head of the user, the movement of the head can be detected. A second method is a transmitter for generating electromagnetic waves. By placing a small-size transmitter on the head 21 of the user 20 and detecting it by a plurality of fixed position sensors 1 installed in a display space, the position of the head 21 can be detected. A third method is for detecting an irradiation spot of an infrared laser. If the user wears spectacles, an infrared laser is placed on a part of the spectacles and an irradiation spot of infrared laser light on a display surface is detected by fixed position sensors installed in a display space, the movement of the head 21 of the user 20 can be detected. There is an advantage of being able to precisely detect a movement approximate to the movement of the viewpoint of the user 20 by placing the infrared laser on the spectacles. By using infrared radiation, it can be separated from visible light irradiated to the projection plane 6g of the projector 3g and the movement of the viewpoint can be precisely grasped.

The projector 3g of this embodiment may be provided with the speaker 23. The controller 5 maneuvers sound to be outputted from the speaker 23 based on the positional information of the user 20 from the fixed position sensors 1, whereby effective sound corresponding to the projection plane 6g can be given to the user 20 holding the projector 3g. In the case where a plurality of users simultaneously project videos, sounds can be given only to a specific user by controlling the speakers of the projectors of the respective users. In this way, a plurality of users can use the display space by dividing the display space.

Sixth Embodiment

Next, a sixth embodiment of the present invention is described. This embodiment relates to a sensory game using the projector system of any one of the above first to fifth embodiments.

A user installs a plurality of fixed position sensors in a space used for a game beforehand to program a game space. One or more users enter the game space while each holds a mobile projector. The game is started by projecting a video from the mobile projector. By reducing illumination in the display space, a display screen of the projector becomes a spatial landscape. By displaying moving images by the projector in the three-dimensional display space, it can be experienced as if the user would have entered the programmed game space. As the user moves forward in the display space while irradiating the surrounding with the projector, the programmed display screen changes, whereby the user can three-dimensionally observe the programmed space. If moving images are added, the user can experience a simulation space in which the display screen changes with time.

If a plurality of users enter the display space and display images in the surrounding by a plurality of projectors, a more complicated display space can be realized. Roll-playing games enjoyed on two-dimensional screens such as television sets at present can be experienced. If a plurality of users enjoy a game in a dim space, the users can enjoy the game while grasping the mutual positions by obtaining the positional relationship of the respective projectors by fixed position sensors installed around the space.

Since videos are determined with respect to the display surface by the fixed position sensors, the influence of image blurring caused by movements of hands and bodies can be reduced even if the user displays images by the mobile projector while moving around.

In order for the user to enjoy images in the display space while carrying the mobile projector around, he comes across a problem that the reality of videos is impaired by the distortions of images due to unevenness and/or corners of the display surface. A display space free from such unevenness can be designed if it is designed for games, but it is difficult to completely eliminate unevenness and corners at home and in a low-cost display space. As a countermeasure in such a case, it is preferable to provide the mobile projector with a function of correcting the distortion of videos caused by the display surface such as unevenness and corners. For example, videos for detecting the unevenness and distortion of a space can be mixed into display images and projected from time to time and the distortion of videos can be corrected by detecting these. By providing the mobile projector with the function of projecting videos for image correction, videos of the mobile projector can be easily enjoyed even at home without requiring a special display space. If this method is used, a plurality of users can enter a display space while holding projectors and direct the projectors toward different users to display videos on the bodies of the others. By freely changing the clothes, faces and the like of the others in this way, the other users can be used as characters in the game.

Further, by directing the projector toward a stereoimage and projecting videos on the stereoimage, three-dimensional videos can be realized. Furthermore, by shooting a stereoimage as in a shooting game and projecting videos or the like representing the destruction of the stereoimage, three-dimensional videos with realistic sensation can be enjoyed.

If the mobile projector is used like a flashlight, an image projected by the mobile projector looks like an object illuminated by the flashlight. The use of this effect enables such a simulated experience that a display space is assumed as a virtual space and the user moves forward while illuminating the display space with the flashlight. A plurality of users can experience a similar virtual space while carrying a plurality of projectors. By controlling the plurality of projectors using an external controller and fixed position sensors, the plurality of users can experience the same virtual space.

Further, by placing the head sensor for finding out the viewpoint of the user, it is possible to carry out a game utilizing the user's illusion. Such an illusion that a space is largely moving can be given to the user by moving the projected image faster than the movement of the viewpoint in conjunction with the movement of the viewpoint of the user. Further, by projecting videos utilizing an end of the visual field of the user detected by the head sensor, it is also possible to emphasize the user's psychological anxiety and illusion. For example, it becomes possible to visually give such an illusion as if the body were falling or moving at a high speed, wherefore an experience with realistic sensation is possible.

The unevenness of the display surface can be corrected by mixing videos for detecting the unevenness of the display surface into images to be projected by the projector, projecting them and detecting them using a CCD or the like. Besides, it is also possible to mount an infrared laser in the projector, to constantly project videos for detecting the unevenness of the display surface by the infrared laser and to control the projected images while detecting these videos. If an infrared laser is used as the head sensor placed on the head of the user and projection patterns of the infrared laser include such a lattice-shaped pattern as to detect the unevenness of the projection plane, it is possible to project images, for which the unevenness of the screen where the viewpoint of the user is focused is corrected.

The display area of the projector is adjusted by the luminance of the projector relative to ambient brightness. If the surrounding is bright, the display area is restricted to increase the luminance of the screen in order to make a luminance difference from the projector screen larger. Besides, the display area also changes depending on the status of a game and contents of representation. The case of displaying wide view images and the case of displaying narrow view images depend on the status of the game. These cases are controlled by the controller in accordance with the display position, time, and game content. If a pitch-dark room is a display space, only objects displayed by the projector are observed, wherefore a favorite space can be realized by freely programming the display space.

It is effective to design a three-dimensional space, where videos can be displayed, as an amusement facility. By designing a video display space and arranging fixed position sensors at optimal positions, a user having entered the video display space can enjoy the programmed display space by moving forward while projecting videos on the walls, floor and ceiling of the display space by a mobile projector holding by hand. It is also possible to install a mobile projector in a mobile vehicle and to travel while constantly projecting videos. It is also effective to create a video display space in combination with videos of a fixed projector. A normal amusement facility requires the remodeling of the facility in the case of changing exhibition contents. However, according to this embodiment, amusement contents can be changed only by rewriting software. It is also possible to provide a plurality of amusements in the same space, which can realize a drastic cost reduction of the amusement facility.

The display space is required to ensure a specified distance or longer between the user and the projection plane. Although it depends on videos, a movable range of the user is preferably set such that the user can move while keeping a distance of 1 m or longer to the projection plane. If the user is too close to the projection plane, the magnification percentage of videos is too small, with the result that only small videos can be projected. In order to prevent this, it is preferable to ensure a specified distance or longer between the user and the projection plane. Since the distance between the projection plane and the user can be maintained at a specified distance or longer by restricting the movement of the user by a car, belt conveyor or passage, the sizes, focal points and the like of videos can be adjusted to optimal values.

Seventh Embodiment

Next, a seventh embodiment of the present invention is described. This embodiment is an example in which the projector system of any one of the above first to fifth embodiments is used outdoors.

It is possible to use the mobile projector in the suburb and to display video information broadcast by public airwave on a relatively large screen by projecting it on the wall of a building or a target object. It is also possible to display explanation by moving images in art museums, museums, sightseeing spots, amusement facilities and the like. If videos are freely projected in a public place, in some places, the laser light irradiation is prohibited or disturbs others or the contents of videos may be uncomfortable to others. In such a case, an area and contents displayable by the projector can be automatically restricted by installing fixed position sensors. By installing the fixed position sensors at positions where video display is permitted and permitting the projection of the projector by signals from the fixed position sensors, permitted video projection can be made only in the restricted place.

By providing the fixed position sensors with a communication function, the information of the projector can be transmitted to the controller via the fixed position sensors and information from the controller can be transmitted to the projector via the fixed position sensors. By the communication function of the fixed position sensors, the projector can be used only by short-range functions and high-speed communication can be realized with low power consumption. By transmitting information on the installation place of the fixed position sensors to the controller, optimal videos can be projected and displayed in the place where the fixed position sensors are installed. For example, videos can be displayed on specific places and target objects such as museums, CM posters and commercial exhibitions.

By embedding optical identification information such as a barcode or hologram in a projection location, it is possible to read an identification signal by the projector or the fixed position sensors, to recognize the individual information of the display place or the projector based on the read identification signal and to receive videos in conformity with the display place in the form of video information from the controller. In this case, it is preferable to use a laser light source as the light source. Laser beam scanning enables the distant barcode or hologram to be optically identified with high resolution and at a high speed.

It is also possible to input charge information in the projector. The projector can be recognized by putting this information on the wavelength of the light source of the projector or the projected image and letting the fixed position sensors recognize this. If this recognition is possible, limited video information can be transmitted to a specific projector. Therefore, charging can be made utilizing this.

It is also possible to set a specific video display space outdoors and to enjoy using a mobile projector. For example, in the case of enjoyment by projecting videos on a large wall outdoors, videos can be easily projected by installing a plurality of fixed position sensors on the target wall. The fixed position sensors in this case are small and have an easily mountable function and may be disposable. By installing the fixed position sensors in a target place, videos, distance and posture of the projector are discriminated by the controller and videos projected in a mobile manner can be controlled to optimal states. Since the luminance of the mobile projector is not very high, the use in a place with dark surrounding is more effective. By installing the fixed position sensors regardless of indoors or outdoors, an arbitrary place can be used as a projection screen.

It is also effective to control the display contents of the mobile projector by placing a sensor on a part of the user's body. Only a specific user can use. Further, videos of the mobile projector can be controlled based on the positional information of the user.

The present invention is summarized as follows from the above respective embodiments. Specifically, a projector system according to the present invention comprises at least one projector mobile in a specified space and adapted to project a video to a projection area included in the specified space in accordance with inputted video information; a plurality of position sensors each including a position detecting section for detecting a positional relationship of the projector with the projection area and arranged in a specified positional relationship with the specified space; and a controller for controlling a video to be projected from the projector to the projection area based on detection results by the position detecting sections of the plurality of position sensors.

In the above projector system, the relative positional relationship between the projector mobile in the specified space and the projection area where a video is projected from the projector is detected and the video projected from the projector is controlled based on the detected positional relationship, whereby a suitable video can be projected from the projector in conformity with a movement of the projector in the specified space. As a result, a video can be projected from the projector to an arbitrary projection area in the specified space.

The plurality of position sensors are preferably at least three sensors arranged in such a manner as not to be located on the same arbitrary straight line.

In this case, the position of the projector in a three-dimensional space can be grasped.

The plurality of position sensors are preferably at least four sensors arranged in such a manner as not to be located on the same arbitrary plane.

In this case, even if the position of the projector is not fixed with respect to a plane defined by three of the four position sensors, at which of upper and lower sides of this plane the projector is located can be grasped by the remaining position sensor. Therefore, the position of the projector can be more precisely grasped.

The controller preferably includes an analyzing section for analyzing the positional relationship of the projector in the specified space based on detection results by the position detecting sections of the plurality of position sensors and a video information generating section for generating video information to be outputted to the projector based on the positional relationship of the projector in the specified space and outputs the video information generated by the video information generating section to the projector.

In this case, since the positional relationship of the projector in the specified space is grasped and the video information to be inputted to the projector is generated by the video information generating section based on this positional relationship, a video suitable for a positional relationship with an arbitrary projection area in the specified space can be projected from the projector without increasing processings by the projector itself.

The projection area where the video is projected from the projector in accordance with a movement of the projector in the specified space is preferably changed with time.

In this case, the projection area can be spread to the entire specified space by changing the projection area, where a video is projected from the projector, with time by the movement of the projector.

The controller preferably further includes a projection condition determining section for determining projection conditions to be set in the projector in accordance with the positional relationship of the projector in the specified space and sets the projection conditions determined by the projection condition determining section in the projector.

In this case, since the positional relationship of the projector in the specified space is grasped and the projection conditions of the projector suitable for this positional relationship are determined by the projection condition setting section, a video suitable for a positional relationship with an arbitrary projection area in the specified space can be projected from the projector without increasing processings by the projector itself.

The projection conditions preferably include at least one of the focal point, magnification percentage and video correction of the projector.

In this case, since the focal point, magnification percentage and video correction of the projector suitable for the positional relationship of the projector in the specified space can be set, a video from the projector can be precisely projected to the projection area.

The positional relationship of the projector detected by the position detecting sections of the plurality of position sensors preferably includes at least one of the position of the projector and the posture of the projector.

In this case, the position and/or posture of the projector in the specified space can be precisely grasped. Thus, a stable video can be projected in conformity with a movement of the projector.

It is preferable that the projector includes an identification video generating section for projecting a identification video for identifying at least one of the shape and color of the projection area and projects the identification video to the projection area upon projecting a video to the projection area in accordance with the inputted video information; that the plurality of position sensors each further include a video detecting section for detecting a reflected video obtained upon reflecting the identification video projected from the identification video generating section by the projection area; that the analyzing section identifies at least one of the shape and color of the projection area based on the reflected video detected by the video detecting sections of the plurality of position sensors; and that the projection condition determining section determines the projection conditions based on at least one of the shape and color of the projection area identified by the analyzing section and corrects the video of the projector.

In this case, the projection conditions for correcting the video in accordance with the shape and color are determined by identifying the shape and color of the projection area, whereby a video suitable for the projection area can be projected without being influenced by the shape and color of the projection area.

It is preferable that the projector includes a plurality of projectors; and that the video information generating section generates video information to be outputted to the plurality of respective projectors based on the respective positional relationships of the plurality of projectors analyzed by the analyzing section.

In this case, it becomes possible to create one video by combining a plurality of videos projected from the respective projectors. Since the positional relationship of the respective projectors can be grasped by the position sensors, the videos can be projected from the respective projectors in consideration of overlaps of the videos.

The plurality of position sensors preferably include a position sensor arranged in the projector.

In this case, the positional relationship with the other projectors can be more precisely grasped by providing the position sensor in the projector.

It is preferable that the plurality of respective projectors add identification information enabling the identification of themselves to the identification videos; and that the analyzing section specifies the projector by identifying the projector projecting the identification video based on the identification information included in the identification video detected by the video detecting sections of the plurality of position sensors.

In this case, the plurality of respective projectors can be easily recognized by the identification information.

Light sources of the plurality of projectors are preferably LED light sources or laser light sources.

In this case, since the LED light sources and laser light sources are capable of high-speed switching, identification videos can be projected by high-speed switching of several 100 KHz or faster.

It is preferable that each of the light sources of the plurality of projectors emits at least three lights of red, blue and green; and that the plurality of respective projectors add the identification information to the identification videos by causing the light sources to emit lights such that the wavelength of at least one of the red, blue and green lights differs from each other among the plurality of projectors.

In this case, the projectors can be recognized only by detecting the wavelengths of the lights emitted from the projectors.

It is preferable that the plurality of respective position sensors each further include a narrow-band wavelength filter; that the wavelength filters transmit lights having wavelengths set to differ from each other among the plurality of projects; and that the video detecting sections of the plurality of position sensors detect the identification information by detecting the lights transmitting the wavelength filters.

In this case, the lights emitted from the projectors can be selectively detected by the narrow-band filters. The identification information of the projectors can be detected without being influenced by other outside lights.

It is preferable that the light source of each of the plurality of projectors emits at least three lights of red, blue and green and successively turns on the red, blue and green lights; and that the plurality of respective projectors add the identification information to the identification videos by causing the light sources to emit lights such that at least ones of turn-on cycles, turn-on phases, turn-on intervals and turn-on orders of the red, blue and green lights differ from each other among the plurality of projectors.

In this case, the projectors can be recognized only by detecting the turn-on cycles, the turn-on phases, the turn-on intervals and the turn-on order wavelengths of the lights emitted from the projectors.

It is preferable that a head sensor for detecting the position of the head of a user by being arranged on the user holding the projector is further provided; and that the video information generating section generates video information to be outputted to the projector such that a video projected from the projector to the projection area changes according to a change in the position of the head of the user detected by the head sensor.

In this case, a video in conformity with the movement of the user can be projected. For example, it is possible to lull the user into such an illusion of a spatial change by providing a video moving in a direction opposite to the movement of the user's head. It is also possible to give a psychological oppression by projecting a video near a blind spot of the user.

The video information preferably includes acoustic information to be given to the user holding the projector.

In this case, suitable sounds can be provided to the user from the projector in conformity with the movement of the projector in the specified space.

A video projection method according to the present invention for making a projector mobile in a specified space, inputting video information to the projector and projecting a video corresponding to the video information to a projection area included in the specified space, comprising the steps of detecting a relative positional relationship of the projector with the projection area by a plurality of position sensors arranged in a specified positional relationship with the specified space; and controlling a video to be projected from the projector to the projection area based on detection results by the plurality of position sensors.

By the above video projection method, the relative positional relationship between the projector mobile in the specified space and the projection area where the video is projected from the projector is detected and the video to be projected from the projector is controlled based on the detected positional relationship, whereby a suitable video can be projected from the projector in conformity with the movement of the projector in the specified space. As a result, a video can be projected from the projector to an arbitrary projection area in the specified space.

INDUSTRIAL APPLICABILITY

The projector system of the present invention can project an image to a three-dimensional space by linking the position sensors installed in the display space with an image of the mobile projector. The positional relationship of the projector is obtained by the position sensors and the image of the projector is controlled by the controller, whereby the image can be controlled at a high speed.

The projector system of the present invention has an advantage of being able to easily realize a combined video of a video of the projector and a still object, a still image and the like. By providing the fixed position sensors and the controller outside the projector, the miniaturization and lower power consumption of the projector can be promoted, wherefore the projector can be made sufficiently small and light despite its portable use.

The miniaturization and lower power consumption of the projector system of the present invention is possible by using a laser or LED light source, wherefore a mobile micro-projector can be realized. Since display can be made in a three-dimensional space with the projector carried around, it practical effect is large.

What is claimed is:

1. A projector system, comprising:
   at least one projector mobile in a specified space and adapted to project a video to a projection area included in the specified space in accordance with inputted video information;
   a plurality of position sensors each including a position detecting section for detecting a positional relationship of the projector with the projection area and arranged in a specified positional relationship with the specified space; and
   a controller for controlling a video to be projected from the projector to the projection area based on detection results by the position detecting sections of the plurality of position sensors:
   wherein the controller includes:
      an analyzing section for analyzing the positional relationship of the projector in the specified space based on detection results by the position detecting sections of the plurality of position sensors, and
      a video information generating section for generating video information to be outputted to the projector based on the positional relationship of the projector in the specified space; and
   wherein the controller outputs the video information generated by the video information generating section to the projector.

2. The projector system according to claim 1, wherein the plurality of position sensors are at least three sensors arranged in such a manner as not to be located on the same arbitrary straight line.

3. The projector system according to claim 1, wherein the plurality of position sensors are at least four sensors arranged in such a manner as not to be located on the same arbitrary plane.

4. The projector system according to claim 1, wherein the projection area where the video is projected form the projector in accordance with a movement of the projector in the specified space is changed with time.

5. The projector system according to claim 1, wherein the controller further includes a projection condition determining section for determining projection conditions to be set in the projector in accordance with the positional relationship of the projector in the specified space, and sets the projection conditions determined by the projection condition determining section in the projector.

6. The projector system according to claim 5, wherein the projection conditions include at least one of the focal point, magnification percentage and video correction of the projector.

7. The projector system according to claim 6, wherein:
   the projector includes an identification video generating section for projecting a identification video for identifying at least one of the shape and color of the projection area and projects the identification video to the projection area upon projecting a video to the projection area in accordance with the inputted video information;
   the plurality of position sensors each further include a video detecting section for detecting a reflected video obtained upon reflecting the identification video projected from the identification video generating section by the projection area;

the analyzing section identifies at least one of the shape and color of the projection area based on the reflected video detected by the video detecting sections of the plurality of position sensors; and the projection condition determining section determines the projection conditions based on at least one of the shape and color of the projection area identified by the analyzing section and corrects the video of the projector.

8. The projector system according to claim 7, wherein:
the projector includes a plurality of projectors; and
the video information generating section generates video information to be outputted to the plurality of respective projectors based on the respective positional relationships of the plurality of projectors analyzed by the analyzing section.

9. The projector system according to claim 8, wherein the plurality of position sensors include a position sensor arranged in the projector.

10. The projector system according to claim 8, wherein:
the plurality of respective projectors add identification information enabling the identification of themselves to the identification videos; and
the analyzing section specifies the projector by identifying the projector projecting the identification video based on the identification information included in the identification video detected by the video detecting sections of the plurality of position sensors.

11. The projector system according to claim 7, wherein light sources of the plurality of projectors are LED light sources or laser light sources.

12. The projector system according to claim 11, wherein:
each of the light sources of the plurality of projectors emits at least three lights of red, blue and green; and
the plurality of respective projectors adds the identification information to the identification videos by causing the light sources to emit lights such that the wavelength of at least one of the red, blue and green lights differs from each other among the plurality of projectors.

13. The projector system according to claim 12, wherein:
the plurality of respective position sensors each further include a narrow-band wavelength filter;
the wavelength filters transmit lights having wavelengths set to differ from each other among the plurality of projects; and the video detecting sections of the plurality of position sensors detect the identification information by detecting the lights transmitting the wavelength filters.

14. The projector system according to claim 11, wherein:
the light source of each of the plurality of projectors emit at least three lights of red, blue and green and successively turns on the red, blue and green lights; and
the plurality of respective projectors add the identification information to the identification videos by causing the light sources to emit lights such that at least ones of turn-on cycles, turn-on phases, turn-on intervals and turn-on orders of the red, blue and green lights differ from each other among the plurality of projectors.

15. The projector system according to claim 1, wherein the positional relationship of the projector detected by the position detecting sections of the plurality of position sensors includes at least one of the position of the projector and the posture of the projector.

16. A projector system according to claim 1, further comprising a head sensor for detecting the position of the head of a user by being arranged on the user holding the projector, wherein the video information generating section generates video information to be outputted to the projector such that a video projected from the projector to the projection area changes according to a change in the position of the head of the user detected by the head sensor.

17. The projector system according to claim 1, wherein the video information includes acoustic information to be given to the user holding the projector.

18. A video projection method for making a projector mobile in a specified space, inputting video information to the projector and projecting a video corresponding to the video information to a projection area included in the specified space, comprising the steps of:

detecting a relative positional relationship of the projector with the projection area by a plurality of position sensors arranged in a specified positional relationship with the specified space;

analyzing the positional relationship of the projector in the specified space based on detection results by the plurality of position sensors;

generating and outputting video information to the projector based on the positional relationship of the projector in the specified space; and controlling a video to be projected from the projector to the projection area based on detection results by the plurality of position sensors.

* * * * *